July 5, 1966 C. A. MATTSON ET AL 3,259,770
PORTABLE ELECTRIC TOOL WITH A TWO PART HOUSING
Filed June 8, 1962 4 Sheets-Sheet 2
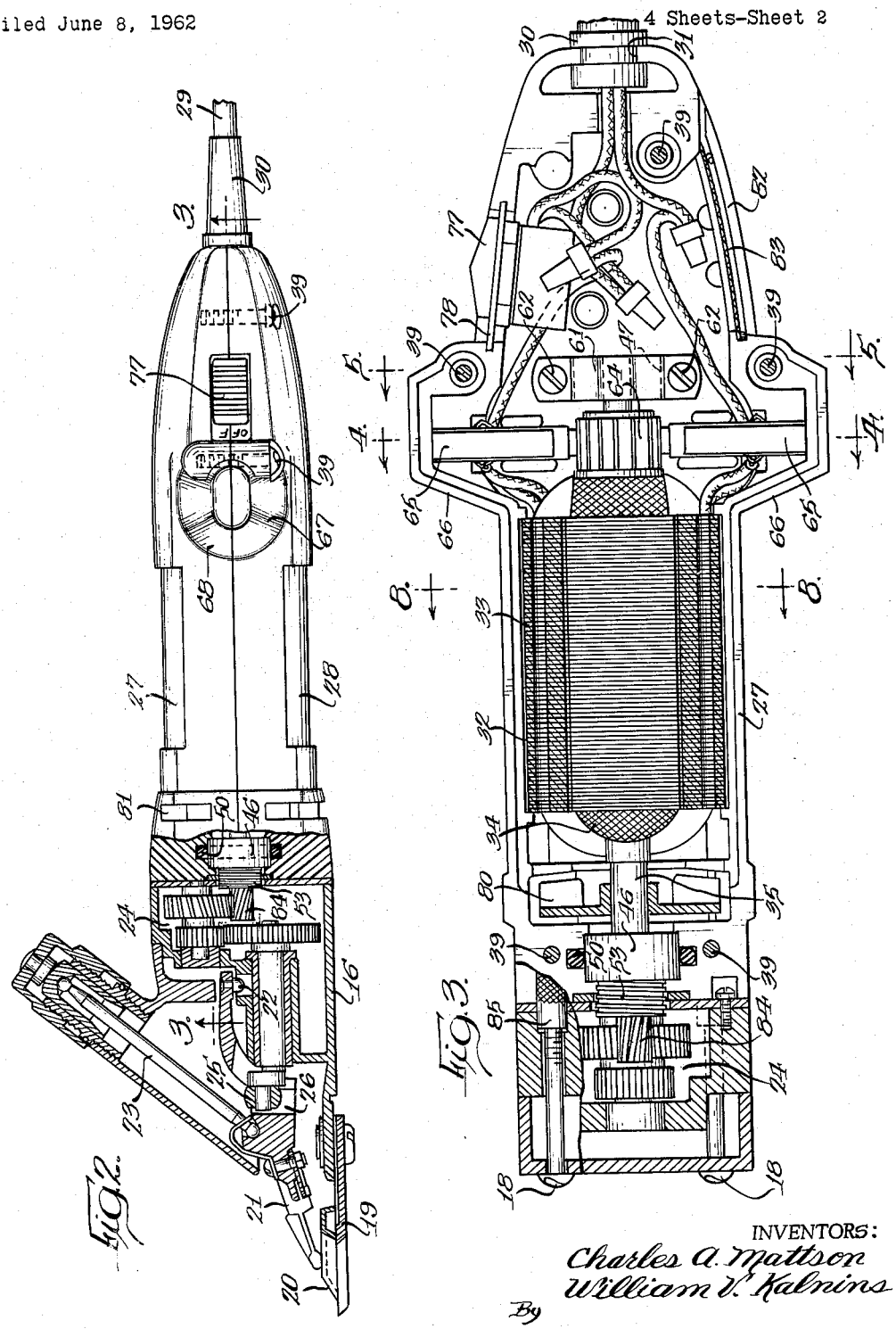
INVENTORS:
Charles A. Mattson
William V. Kalnins
By
George R. Clark Atty

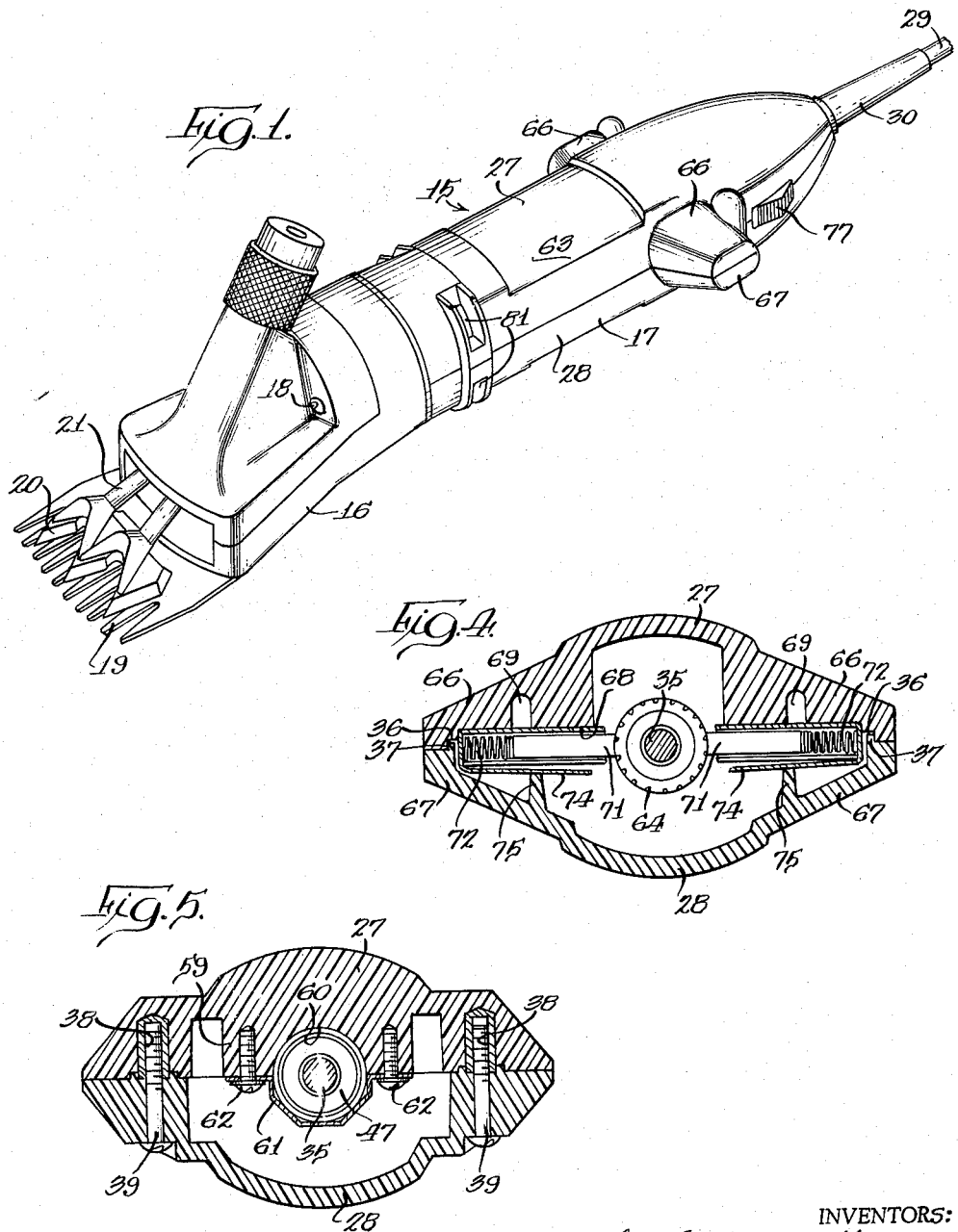

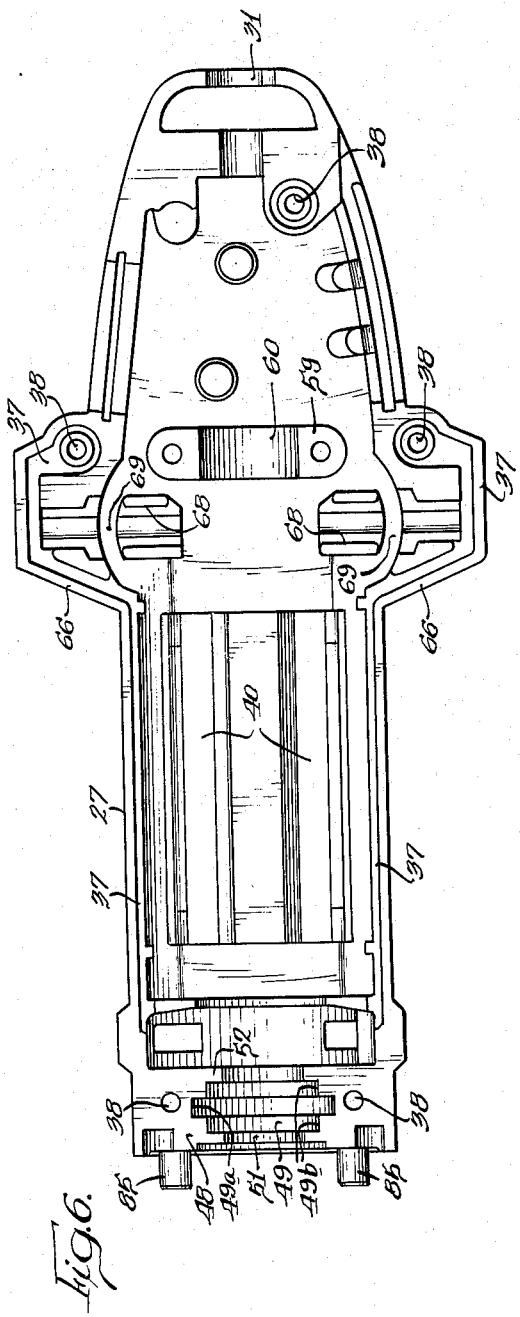
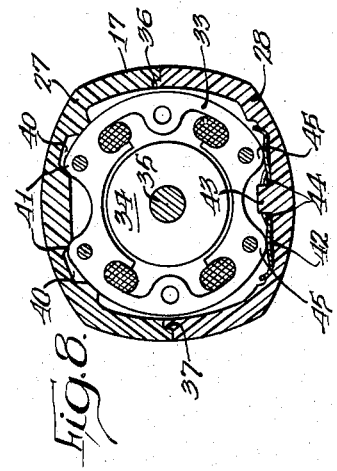
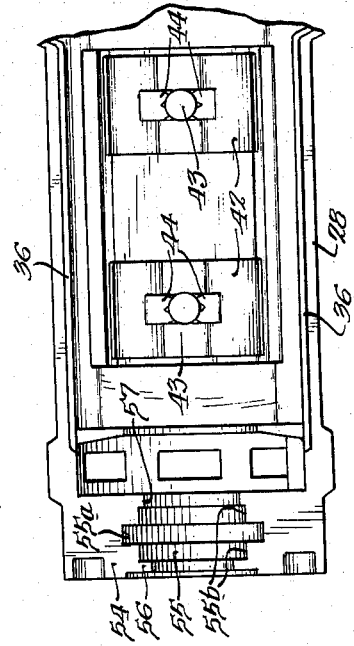
INVENTORS:
Charles A. Mattson
William V. Kalnins
By George R. Clark
Atty

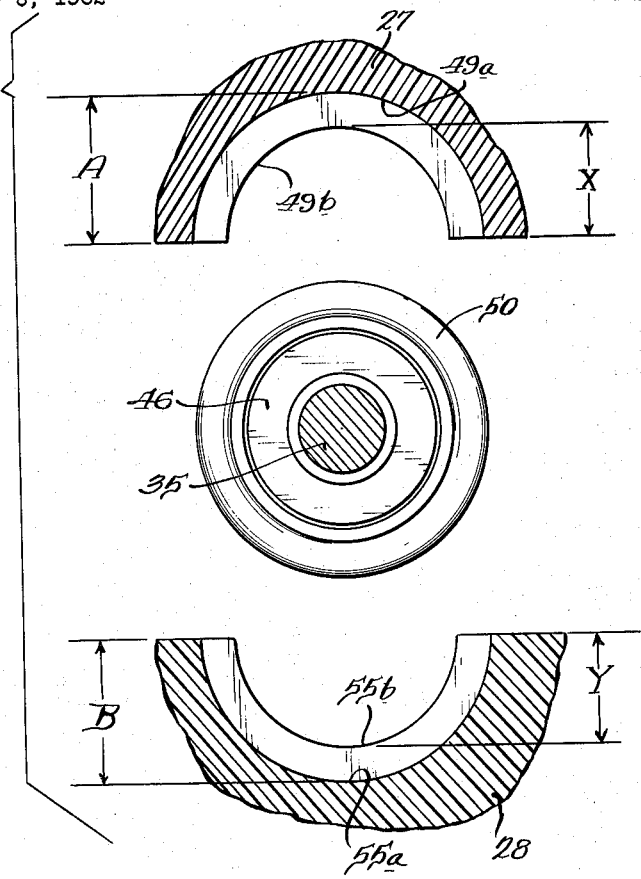
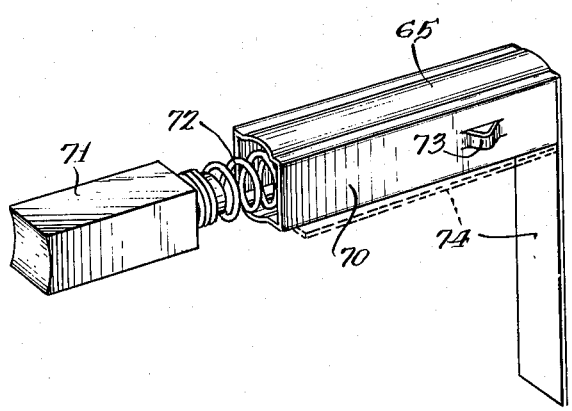
INVENTORS:
Charles A. Mattson
William V. Kalnins
By
George R. Clark, Atty United States Patent Office 3,259,770
Patented July 5, 1966

1

3,259,770
PORTABLE ELECTRIC TOOL WITH A
TWO PART HOUSING
Charles A. Mattson and William V. Kalnins, Oak Park, Ill., assignors to Sunbeam Corporation, Chicago, Ill., a corporation of Illinois
Filed June 8, 1962, Ser. No. 200,984
8 Claims. (Cl. 310—50)

The present invention relates generally to portable electric tools and more particularly to a motor and housing for animal clipping and shearing equipment.

At the present time there are many different types of apparatus available for clipping and shearing animals. This apparatus may, however, be broken down into two general categories. These categories are exemplified by (1) the machines having self-contained electric motors which are connected through gearing to shearing or clipping heads mounted directly on the motor housing, and (2) machines including hand pieces which are connected through flexible or jointed shafts to fixedly positioned motors. The hand piece consists of little more than a shearing head supported on a hand gripping portion with means for converting the rotary motion of the flexible or jointed shaft to oscillating or reciprocating motion in the shearing head.

The shearing hand piece with its flexible connection to the fixedly supported motor has characteristically been used by all the professional shearers for many years. This arrangement provides the shearer with a very lightweight easily gripped tool to which is connected an ample supply of power through the flexible shaft. The shearing and clipping units having the electric motor mounted integrally with the shearing head have been characterized by their large size and lack of adequate power. Because of these drawbacks in the shearing devices with their integral motors, the professional shearers have been unwilling to use them even though there are advantages and economies associated with them.

As a consequence the animal clipping and shearing devices having integral motors have been used almost exclusively by farmers, nonprofessionals and shearers who have limited amounts of work to do with these units. These farmers and nonprofessional shearers are attracted to the integral type motor unit because of the low initial cost as well as the ease in setting up and preparing for clipping or shearing. In general, all that is required to start clipping or shearing with the integral type unit is a power cord or receptacle to which the unit may be connected. In contrast, the hand piece type of setup requires a large bulky motor, a frame for supporting the flexible or jointed shaft and the hand piece itself making the apparatus much less portable than the integral type unit. It has long been the goal of manufacturers of clipping and shearing apparatus to provide a single unit which would satisfy both the professional and nonprofessional shearers. To accomplish this objective, it would be necessary to provide an extremely lightweight, compact motor which could be included in an integral type shearing device and which would have sufficient power to satisfy the professional shearers. The motor must be compact enough so that it can be readily gripped and manipulated by a professional shearer who would use the device eight or ten hours a day.

It is, therefore, an object of the instant invention to provide an improved animal clipping and shearing machine having a motor with the shearing head attached integrally thereto.

It is a further object of the present invention to provide a compact lightweight motor housing which may be readily gripped by an operator.

It is an additional object of the present invention to

2 provide an animal clipping and shearing machine having a phenolic housing which supports the various elements of the electric motor.

It is a further object of the invention to provide a motor housing which is split along a plane through the axis of the armature and which grips the field, the brushes and one of the armature bearings between the two housing halves.

It is an additional object of the present invention to provide a split housing motor in which resilient means are utilized to bias one of the armature bearings into seated engagement with one of the housing halves.

It is a further object of the present invention to provide a motor having one of the armature bearings resiliently biased against its mounting seat by means of a resilient O-ring.

It is an additional object of the present invention to provide an animal clipping and shearing machine having an elongated motor positioned within a gripping portion of the housing with the brush enclosing portions of the housing extending radially to the side in the section rearward of the gripping portion.

It is an additional object of the present invention to provide a two-piece motor housing between which the elements of the motor are clamped and utilizing a one-piece brush holder having integrally formed resilient means for biasing it against its mounting seat.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a top perspective view of an animal clipping and shearing machine embodying the present invention;

FIG. 2 is an enlarged side elevational view of the animal clipping and shearing machine shown in FIG. 1 with portions of the shearing head cut away;

FIG. 3 is an enlarged sectional view taken along line 3—3 of FIG. 2 with the shearing head removed but assuming FIG. 2 shows the complete structure;

FIG. 4 is a sectional view taken along line 4—4 of FIG. 3 assuming FIG. 3 shows the complete structure;

FIG. 5 is a sectional view taken along line 5—5 of FIG. 3 assuming FIG. 3 shows the complete structure;

FIG. 6 is a plan view of the upper housing half of the clipping and shearing machine of FIG. 1;

FIG. 7 is a fragmentary plan view of the forward portion of the lower housing half of the clipping and shearing machine of FIG. 1;

FIG. 8 is a sectional view taken along line 8—8 of FIG. 3 assuming FIG. 3 shows the complete structure;

FIG. 9 is an exploded sectional view of the front armature bearing and its supporting structure; and FIG. 10 is an enlarged perspective view of one of the brush holders forming a part of the clipping and shearing machine.

Briefly, the present invention is concerned with an animal clipping and shearing machine having a rotary electric motor connected through reduction gearing to a shearing head carried at one end of the housing for the motor. The motor housing, which itself serves as the support for the various elements of the motor, is divided along a plane passing through the motor armature axis into upper and lower housing halves. One of the armature bearings, the motor field and the brush assemblies are held in position by the clamping action of the housing halves. Simplified means are provided to facilitate the clamping of the brush assemblies and the front armature bearing between the housing halves. The motor housing serves as a hand grip for the shearing machine. To enable an operator to grip easily the motor housing, the motor is elongated and of small diameter with the brush assemblies positioned rearwardly of the gripping portion and extending outwardly therefrom.

Referring now to the drawings, there is illustrated an animal clipping and shearing machine generally designated by reference numeral 15. This clipping and shearing machine includes a shearing or operating head 16 and a motor housing 17. The shearing head is detachably secured to one end of the motor housing 17 by means of elongated screws 18. The shearing head 16 is made readily removable from the motor housing 17 so that it may be replaced by other types of shearing heads depending on the type of operation to be performed. The head shown by way of example in FIGS. 1 and 2 is designed primarily for the shearing of sheep.

The head 16 includes a toothed comb 19 and a three-toothed movable cutter 20 which is oscillated relative to the comb 19. The cutter 20 is supported and driven by means of a fork 21 which is mounted for oscillatory movement about a pivot 22. An adjustable tension pin 23 is utilized to apply pressure on the fork to regulate the force of engagement between the cutter 20 and the comb 19.

As is best shown in FIG. 2, the head 16 includes reduction gearing 24 through which the fork 21 is driven by means of an eccentric 25 which drivingly engages slot 26 in the fork 21. The design of the shearing head 16 is conventional and forms no part of the instant invention except insofar as the invention is concerned with the mode of mounting the head with respect to the motor housig 17. It should be understood that the sheep shearing head 16 may be replaced by other heads more suitable for other clipping and shearing tasks. In this regard, attention is directed to Jepson Patent No. 2,268,035 which shows a clipping head suitable for use on horses and cattle. The head shown in this Jepson patent is also designed for detachable mounting on a motor housing similar to housing 17 shown herein.

The motor housing 17 includes an upper housing half 27 and a lower housing half 28. For reasons which will become more obvious, the upper housing half is also referred to as the base or base portion of the housing while the lower housing half 28 is referred to as the cover or cover portion of the housing. As is evident from FIG. 1, the upper and lower housing halves 27 and 28 fit together to form an elongated tubular housing; one end of which supports the shearing head 16 and the other end of which is tapered toward its point of connection with a power cord 29. The power cord 29 may be a two conductor cord having a molded cord guide and strain relief 30 which is received in an opening 31 formed by the two housing halves which grip the strain relief 30 therein.

Referring to FIG. 3, there is shown the upper housing half 27 or base portion with a motor 32 supported thereon. The housing halves 27 and 28 may be considered portions of the motor 32 to the extent they support and position the various elements of the motor. The motor 32 includes an elongated stator or field 33 and an elongated rotary armature 34 which is supported on an armature shaft 35. An inspection of the sectional view in FIG. 8 reveals the manner in which the motor housing 17 closely conforms to the outer dimensions of the stator 33. Such an arrangement permits the housing to be made of small enough size so that it may be readily gripped by the operator while still permitting the use of a motor sufficiently powerful to drive a sheep shearing head for an extended period of time.

To assure proper assembly of the upper and lower housing halves 27 and 28, there is provided a small flange 36 extending upwardly around the inner edge of the wall of the lower housing half 28. A complementary notched out portion 37 is formed in the wall of the upper housing half to receive the flange 36 and permit continuous engagement of the adjacent wall portions of the housing halves. As is best shown in FIG. 6, the upper housing half 27 is provided with a plurality of tapped holes 38 which receive assembly screws 39 extending through aligned openings in the lower housing half 28.

To locate and position the stator 33 with respect to the base portion 27 of the housing, there are integrally molded grooves 40 extending lengthwise of the housing half 27. The grooves 40 or the lands adjacent thereto cooperate with the lengthwise extending ridges 41 on the upper edge of the stator 33 to position accurately the stator 33 within the housing half 27. Spaced below the grooves 40 in the opposite housing half 28 are a pair of resilient stator assembly members 42. The lower housing half 28 is provided with integrally molded posts 43 to which the resilient assembly members 42 are assembled. The members 42 are formed with bent up tabs 44 which when assembled on the posts 43 are deflected upwardly at an angle thereby engaging the posts and preventing disassembly of the members 42 from the housing half 28. The locking action of the tabs 42 results from the opening between the opposed tabs being smaller than the posts 43 in diameter and from the tab ends digging into the plastic of posts 43.

Extending sidewardly from the posts 43, the assembly members 42 are bowed upwardly away from the bottom of the housing half 28. The outer ends of the members 42 have turned up ends and engage the bottom of the housing half 28. As may best be seen in FIG. 8, longitudinally extending ridges 45 on the lower edge of the stator 33 engage the upwardly bowed portions of the members 42. Thus, as the housing halves 27 and 28 are drawn together by the assembly screws 39, the resilient assembly members 42 apply a biasing force against the stator 33 urging it into seated engagement with the upper housing half or base portion 27.

A consideration of FIG. 8 reveals that there is very little clearance between the stator 33 and the motor housing 17. The reason for this is, of course, the desire to maintain the size of the housing 17 at a minimum so that it may be readily gripped in the hand of an operator. Some clearance between the stator and housing is necessary, however, to circulate cooling air around the elements of the motor including the stator 33. The assembly members 42 are designed so that they restrict the cooling air flow through the space between the housing 17 and the stator 33 as little as possible. The assembly members 42 are made of thin spring steel stock and present almost no resistance to the flow of cooling air.

The armature shaft 35 is supported for rotation by a forward armature bearing 46 and a rear armature bearing 47. The bearings 46 and 47 may be sleeve type bearings but are preferably anti-friction type roller or ball bearings. The base portion 27 of the motor housing 17 includes a forward bearing supporting wall 48 extending across one end thereof. The wall 48 is formed with a generally semi-cylindrical recess 49. Referring to FIG. 6, it may be seen that the recess 49 includes a number of cylindrical surfaces having different diameters. The largest diameter surface or shoulder designated 49a is centrally located within the bearing supporting wall 48 and is intended to receive the upper half of a resilient O-ring 50. Immediately adjacent the cylindrical surface 49a are two cylindrical shoulders 49b of lesser diameter and spaced on either side of the surface 49a. The shoulders 49b are intended to receive and position the upper cylindrical portion of bearing 46. To locate the bearing 46 axially with respect to the motor housing 17, there are provided flanges 51 and 52 adjacent the forward and rearward faces, respectively, of the bearing 46. While the flange 52 defines a semi-cylindrical recess surrounding the armature shaft 35, the only purpose of this recess is to provide clearance for the shaft. The forward flange 51 forms a semi-cylindrical recess which closely conforms to a helical worm member 53 which is best shown in FIGS. 2 and 3. The worm member 53 is rotated in such a direction as to cause any grease moving rearwardly from the shearing head 16 to be forced forwardly rather than moving through the bearing 46 into the motor housing 17.

The lower housing half 28 also includes a forward bearing supporting wall 54 which corresponds to and abuts the wall 48 formed in the upper housing half 27. In addition, the bearing supporting wall 54 includes a bearing recess 55 having a semi-cylindrical recess or groove 55a for the resilient O-ring 50 and spaced shoulders 55b for the lower half of the bearing 46. There are also provided in the wall 54 a forward flange 56 and a rear flange 57 for locating the bearing 46 axially and cooperating with the flanges 51 and 52 in providing a grease seal and a clearance opening for the armature shaft 35.

To best understand the manner in which the bearing 46 is supported within bearing recesses 49 and 55 in the housing halves 27 and 28, respectively, attention is directed to FIG. 9 which includes an enlarged showing of the complementary portions of the walls 48 and 54 which support the O-ring 50 as well as the armature bearing 46. The sole purpose of the resilient O-ring 50 is to provide a simple and efficient means of resiliently biasing the bearing 46 into seated engagement with the base portion 27 of the motor housing 17. If the bearing recesses 49 and 55 and the O-ring recesses 49a and 55a were made identical in both of the housing halves, the bearing 46 would either be clamped rigidly between the housing halves 27 and 28 or would be resiliently supported therein in contact with neither of the housing halves. To assure that the bearing will seat against the spaced shoulders 49b and be spaced from the shoulders 55b, the depth of the recess 49 is made substantially less than the depth of the recess 55. This arrangement merely assures a closer fit of the bearing in the base portion 27 and clearance with respect to the cover portion 28. As shown in FIG. 9, dimension X is less than dimension Y. In one constructed embodiment, X was equal to .433 inch and Y equal to .436 inch.

Considering now the annular O-ring recesses 49a and 55a, the recess 49a is made substantially deeper than the recess 55a. The result of this arrangement is that the portion of the O-ring in the recess 55a is substantially compressed thereby exerting a biasing force on the bearing 46 urging it into seated engagement with the base portion 27. The O-ring recess 49a is sufficiently large so that no biasing force is produced by the O-ring 50 tending to urge the bearing 46 out of its seated engagement with the base portion 27. The depth of recess 49a, designated in FIG. 9 by reference A, was .562 inch in one constructed embodiment while the depth of recess 55a, designated by B, was only .554 inch.

The rear armature bearing 47 is also seated in the base portion 27 of the motor housing. A bearing supporting projection 59 extends upwardly from the bottom of the housing portion and has a semi-cylindrical recess 60 formed at its upper end to receive the armature bearing 47. A bearing assembly strap 61 is assembled by means of screws 62 to secure the bearing 47 within the recess 60.

The motor 32 is of the series type having a commutator 64 carried by the armature shaft 35 just forward of the rear armature bearing 47. A pair of brush holders 65 are positioned at diametrically opposed sides of the commutator within the motor housing 17. While the motor 32 and the housing 17 have been made as small in diameter as possible to facilitate gripping of the housing by an operator, it was found to be impossible to provide brushes of sufficient length which could be accommodated within the small housing diameter of the gripped portion thereof. It should be understood that shearing machines of this type are subjected to very severe and continuous use. As a consequence brush life becomes a very important aspect of design. To accommodate brushes of almost one inch in length, it was necessary to provide a T-shaped housing with the brushes extending outwardly beyond the tubular portion of the housing. Referring to FIG. 1, the portion of the housing rearward of the shearing head 16 is designated the hand grip portion 63. Adjacent the hand grip portion 63, the base portion 27 of the housing 17 is formed with brush receiving projections 66 and the cover portion 28 is provided with brush receiving projections 67. As may best be seen in FIGS. 1, 2 and 4, the cooperating projections 66 and 67 on the upper and lower housing portions, respectively, cooperate to form truncated conical projections with inwardly facing recesses within which the brush holders 65 are received.

To support and locate the brush holders 65, the base portion 27 is formed with channel-shaped supports 68 on which the brush holders are received. Portions of the housing half 27 defining the channel-shaped supports 68 are cut away at 69 to permit clearance for the lead connections extending from the power cord end of the housing 17 forwardly to the stator 33. Several of the leads are connected directly to the brush holders 65 while others extend beneath the brush holders 65 forward to the stator 33.

Referring to FIG. 10, there is shown the details of the brush holders 65. Each brush holder includes an elongated tubular portion 70 within which a suitable carbon brush 71 is slidably received. A suitable biasing spring 72 is employed to urge the brush 71 against the commutator and aid in establishing contact between the brush 71 and the brush holder 65. The brush holder 65 is preferably formed of one piece of brass bent to the box or tubular shape with integrally formed projections 73 provided for lead connections to the brush holder. To close the outer end of the tubular portion 70 of the brush holder, an integral tab 74 is provided. As may best be seen in FIG. 10, the tab 74 extends at right angles to the lengthwise dimension of the tubular portion 70 thereby closing the outer end of the brush holder 65 and providing a base against which the biasing spring 72 acts.

Upon assembly of the brush holder to the motor housing 17, the tab 74 is bent toward the tubular portion 70 of the brush holder as shown in dotted lines in FIG. 10. The cover portion or lower housing half 28 includes a pair of upstanding walls or bosses 75 which engage the bent over tabs 74 of the brush holders 65 and urge them into seated engagement with the channel-shaped supports 68 formed in the base portion 27. This provides an extremely simple and effective brush holder and assembly means for the brush holder. To replace the brushes 71, it is merely necessary to remove the five screws 39, lift off the cover portion 28 thereby freeing the brush holders 65. The new brushes may be inserted in the tubular portions 70 of the brush holders and the cover portion 28 of the housing replaced.

Energization of the motor 32 is controlled by a slide switch 77 which is connected in circuit between the power cord 29 and the motor 32. The switch 77 is a conventional slide switch having a flange 78 which is received in complementary slots extending around openings formed in the housing halves 27 and 28 and thereby secured in position in the motor housing 17.

To assure adequate cooling of the motor 32, a centrifugal fan 80 is mounted on the forward end of the armature shaft 35. Spaced outwardly from the fan 80 are air discharge slots 81 formed in the motor housing 17. At the end of the housing adjacent the power cord connection, there is provided an air inlet opening 82 which is located half in the base portion 27 and half in the cover portion 28. Positioned across the air inlet opening 82 is a screen or wire mesh member 83 which is intended to prevent foreign matter from being drawn into the motor housing 17. The screen 83 is received and gripped in a slot extending around the opening 82.

The above-described animal shearing and clipping machine has the advantage of having very few parts which are very easily assembled. The entire motor housing 17 and all the motor elements mounted therein are secured in place by means of the five housing assembly screws 39 and the two rear armature strap screws 62. The cooperating housing halves 27 and 28 are formed to clamp and support the cord guide and strain relief 31, the control switch 77, the brush holders 75, the air inlet screen member 83 and the forward armature bearing 46. The primary reason for using the separate retaining strap 61 for the rear bearing 49 is so that when the housing halves are disassembled for replacement of the brushes 71, there is no possibility of the armature 34 becoming dislodged from the base portion 27 of the housing.

The forward end of the armature shaft 35 is formed with an integral worm 84 which is in driving engagement with the reduction gearing 24 when the shearing head 16 is mounted on the motor housing 17. In connection with the mounting of the shearing head 16, the base portion 27 of the housing 17 has a pair of locating pins 85 molded integrally therewith. The pins 85 extend forwardly from the forward bearing supporting wall 48. The pins 85 are adapted to locate the shearing head 16 with respect to the motor housing 17 and are drilled and tapped to receive the shearing head assembly screws 18 referred to above.

It should be particularly noted that all of the elements of the motor are positively positioned with respect to the upper housing half or base 27. The armature bearings 46 and 47 as well as the stator 33 are firmly seated in the base with the resilient biasing means acting between the cover portion 28 and these elements. With the shearing head 16 also accurately located with respect to the base portion 27 by means of the pins 85, there is assured accurate alignment of all the operating parts of the clipping and shearing machine 15. This accurate location of the parts is particularly important with respect to the worm 84 and the reduction gearing 24. In the above-described arrangement with the shearing head 16 positioned by the pins 85 with respect to the armature bearings 46 and 47 and the armature shaft 35, a smooth running engagement between the worm 84 and the gearing 24 is assured. Another advantage associated with having all the elements including the shearing head 16 mounted on the base 27 is the simplification in changing the brushes 71. The cover 28 may be removed or disassembled from the base 27 for the purpose of brush replacement without removing the shearing head 16.

While there has been shown and described one embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. A portable electric tool comprising a tubular housing having a hand grip portion suitable for being gripped by the hand of the user, said housing being formed of an electrically insulating plastic material, an elongated motor having a stator and a rotary armature positioned within said housing, said housing being divided lengthwise into a base and a cover, an operating head mounted at the forward end of said base, means securing said stator and the bearings for said armature directly to said base, a pair of housing projections extending laterally of said tubular housing rearwardly of said hand grip portion, said projections being integrally formed with said base and said cover, said projections each having inwardly opening recesses formed therein, and brush assemblies formed of electrically conducting material and being supported in said recesses by said housing in insulated relation to the other parts of said motor.

2. The portable electric tool of claim 1 wherein each of said projections is formed partly by said base and partly by said cover, said brush assemblies being clamped between said base and cover.

3. A portable electric tool comprising motor housing having a hand grip portion, an elongated motor having a stator and a rotary armature positioned within said hand grip portion, said housing including upper and lower housing halves which abut at a plane substantially coincident with the axis of said armature, an operating head mounted at the forward end of said upper housing half, means securing said stator and the bearings for said armature to said upper housing half, a pair of housing projections positioned rearwardly of said hand grip portion and each being partly in said upper and partly in said lower housing half, the portions of said projections in said upper housing half having channels formed therein to receive brush assemblies, said brush assemblies each having a tubular brush holder and a resilient assembly tab, and means within the portions of said projections in said lower housing half engaging said assembly tabs and biasing said brush holders into said channels.

4. A portable electric tool comprising an elongated housing having an operating head at one end and a power cord connected to the other end, a motor enclosed in said housing connected to said power cord, said housing including upper and lower housing halves each having adjacent bearing recesses for receiving and clamping therebetween one of the motor bearings for the armature shaft, the upper housing half recess being shallower than the lower housing half recess, resilient means acting between said lower recess and said one of the motor bearings to urge it into seated engagement in said upper recess, said motor having a pair of brush assemblies, means on said housing halves for clamping said brush assemblies therebetween, a pair of openings defined by the walls of both housing halves, a switch connected in series with said power cord and motor to provide means for energizing said motor, said switch being received in one of said openings, and the end of said power cord received in the other of said openings, said housing halves clamping said cord end and said switch in position in said openings.

5. The portable electric tool as set forth in claim 4 wherein said motor includes two bearings, the forward one of which is received in said adjacent bearing recesses, a semi-cylindrical bearing recess provided in said upper housing half for the second motor bearing, and means rigidly clamping said second motor bearing to the upper housing half.

6. The portable electric tool as set forth in claim 5 wherein said operating head is detachably secured to said upper housing half and includes reduction gearing mounted to drive an operating member, said motor having an armature shaft supported in said motor bearings and a worm gear formed on one end thereof in driving engagement with said reduction gearing.

7. A portable electric tool comprising a tubular housing having a hand grip portion suitable for being gripped by the hand of the user, an elongated motor having a stator and a rotary armature positioned within said housing, said housing being divided lengthwise into a base and a cover, an operating head mounted at the forward end of said base, means securing said stator and the bearings for said armature to said base, a pair of housing projections extending laterally of said tubular housing rearwardly of said hand grip portion, said projections each having inwardly opening recesses formed therein, brush assemblies received in said recesses, each of said projections being formed partly by said base and partly by said cover, the portion of said base forming said projections having open ended channels for receiving said brush assemblies, resilient assembly means on said brush assemblies, and wall portions on said cover engaging said resilient assembly means to bias said brush assemblies into said channels.

8. The portable electric tool of claim 7 wherein said base and said cover each have adjacent bearing recesses for receiving and clamping therebetween at least one of said armature bearings.

References Cited by the Examiner

UNITED STATES PATENTS

| | | | |
|---|---|---|---|
| 1,525,826 | 2/1925 | Perlman | 310—50 |
| 1,811,903 | 6/1931 | Van Bree | 30—216 |
| 1,871,700 | 8/1932 | Jeppsson et al. | 30—216 |
| 1,919,516 | 7/1933 | Koch | 30—216 |
| 2,294,713 | 9/1942 | Boerger | 310—50 |
| 2,586,415 | 2/1952 | Boerger | 310—46 |
| 2,650,993 | 9/1953 | Brown et al. | 310—50 |
| 2,696,568 | 12/1954 | Jepson et al. | 310—47 |
| 2,819,522 | 1/1958 | Jepson et al. | 30—216 |
| 2,984,757 | 5/1961 | Papworth | 310—50 |
| 3,112,417 | 11/1963 | Tamm | 310—90 |
| 3,119,942 | 1/1964 | Luther | 310—90 X |
| 3,121,813 | 2/1964 | Pratt | 310—50 |
| 3,143,677 | 8/1964 | Heiler | 310—239 |

MILTON O. HIRSHFIELD, *Primary Examiner.*

JOHN F. COUCH, ORIS L. RADER, LEWIS J. LENNY, *Examiners.*

A. R. GUEST, J. W. GIBBS, *Assistant Examiners.*